(12) United States Patent
Faye (10) Patent No.: US 11,190,905 B2
(45) Date of Patent: Nov. 30, 2021

(54) METHOD FOR DETERMINING THE RELATIVE PROXIMITY OF WIRELESS NETWORKED DEVICES

(71) Applicant: Luxembourg Institute of Science and Technology (LIST), Esch-sur-Alzette (LU)

(72) Inventor: Sébastien Faye, Distroff (FR)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 0 days.

(21) Appl. No.: 16/958,310

(22) PCT Filed: Dec. 21, 2018

(86) PCT No.: PCT/EP2018/086585
§ 371 (c)(1),
(2) Date: Jun. 26, 2020

(87) PCT Pub. No.: WO2019/129708
PCT Pub. Date: Jul. 4, 2019

(65) Prior Publication Data
US 2021/0067906 A1 Mar. 4, 2021

(30) Foreign Application Priority Data

Dec. 29, 2017 (LU) .................................. LU100598

(51) Int. Cl.
*H04W 4/00* (2018.01)
*H04W 24/00* (2009.01)
(Continued)

(52) U.S. Cl.
CPC ........... *H04W 4/023* (2013.01); *H04W 8/005* (2013.01); *H04W 40/246* (2013.01); *H04W 84/18* (2013.01)

(58) Field of Classification Search
CPC ... H04W 4/023; H04W 8/005; H04W 40/246; H04W 84/18
See application file for complete search history.

(56) References Cited

U.S. PATENT DOCUMENTS

2008/0004037 A1  1/2008  Achlioptas et al.
2014/0038599 A1  2/2014  Bienas et al.
(Continued)

OTHER PUBLICATIONS

U.S. Office Action, U.S. Appl. No. 16/958,343, dated Apr. 15, 2021, 17 pages.
(Continued)

*Primary Examiner* — Erika A Washington
(74) *Attorney, Agent, or Firm* — Rankin, Hill & Clark LLP (57) ABSTRACT

The present invention provides a method for determining the relative proximity of wireless network devices. The method may advantageously be executed locally on a computing device, so that it provides enhanced reliability, responsiveness, security and privacy as compared to known methods requiring Internet access and/or satellite positioning signals. The determination of the proximity of networked devices allows for efficient implementation of several social network services, such as shared mobility services or location-based services, wherein the proximity of users/devices is a key 10 incentive for the service's usage.

13 Claims, 3 Drawing Sheets

(51) Int. Cl.
| | |
|---|---|
| *H04W 4/02* | (2018.01) |
| *H04W 8/00* | (2009.01) |
| *H04W 40/24* | (2009.01) |
| *H04W 84/18* | (2009.01) |

(56) References Cited

U.S. PATENT DOCUMENTS

2016/0212642 A1   7/2016  Ljung et al.
2017/0206334 A1*  7/2017  Huang .................. G16H 50/30

OTHER PUBLICATIONS

International Search Report, PCT/EP2018/086585, dated Mar. 13, 2019, 2 pages.
Kjaergaard et al., "Mobile Sensing of Pedestrian Flocks in Indoor Environments Using WiFi Signals", 2012 IEEE International Conference on Pervasive Computing and Communications, Lugano, Mar. 19, 2012, 8 pages.
Derango, et al., "GeO-LANMAR: A Scalable Routing Protocol for Very Large, Dense Ad Hoc Networks with Group Motion", Global Telecommunications Conference, Globecom '05, vol. 5, Nov. 28, 2005, 6 pages.
International Search Report, PCT/EP2018/086683 dated Mar. 27, 2019, 3 pages.
Gareth Ayers, et al. "Crowd-Sourcing Wi-Fi Coverage Data to Build Self-Mapping Radio Maps", Sep. 17, 2012, 9 pages.

* cited by examiner

METHOD FOR DETERMINING THE RELATIVE PROXIMITY OF WIRELESS NETWORKED DEVICES

TECHNICAL FIELD

The present invention lies in the field of communication systems, and in particular relates to the determination of the relative proximity of computing devices having access to wireless networking technologies.

BACKGROUND OF THE INVENTION

In order to leverage the possibilities brought about by the pervasive use of mobile computing devices having the capability to access wireless networks, it is interesting to have the ability to locate several mobile devices, possibly attributed to several users, with respect to each other. Device proximity information enables for example services such as shared mobility, wherein users of mobile computing devices who regularly travel similar routes may be brought in touch with each other, inciting them to share their vehicles for more efficient transportation usage.

Nowadays, device tracking using the Global Positioning System, GPS, or similar satellite-based positioning systems, is the gold standard for known shared mobility solutions or location-based services, and for device, i.e. GPS receiver, positioning in general. Although the GPS system offers accurate positioning data, it also requires considerable storage space and has a high energy consumption profile. Energy consumption is a limiting factor in today's mobile computing devices such as tablet computers, smartphones, but even more so in devices attributed to the Internet of Things, IoT. Furthermore, the high level of accuracy provided by the GPS system may give rise to privacy issues regarding the movement and activity of users, while such a privacy intrusion may not be necessary for the provision of shared mobility services or location-based services, for example. As the GPS system operates only with the line of sight of several satellites among the GPS satellite constellation, it inherently cannot cover all places. In particular, indoor positioning is precluded.

Known solutions providing the establishment of user's mobility profiles through tracking of their mobile computing devices are usually centralized on a server or on a cloud service, and they require network connections to external services, such as geographical location databases or map data services. The number of mobile devices is set to increase with the onset of the Internet of Things. This means that further positioning data, stemming from the tracking of IoT devices, may become available and may potentially add to improving user's mobility profiles. As IoT devices generally do have neither any direct connection to Internet services, nor GPS signal receiving capabilities, the known methods for establishing user's mobility profiles are nowadays not able to efficiently reap this information and put it to use.

Technical Problem to be Solved

It is an objective of the present invention to provide a method and system which overcome at least some of the disadvantages of the prior art.

SUMMARY OF THE INVENTION

In accordance with a first aspect of the invention, a method for detecting the proximity of at least two disjoint sets of computing devices is provided. Each device comprises at least one wireless network interface for communicating with wireless network access nodes, a processing unit and a memory element. The method comprises the following steps:

a) at each device, discovering at least one wireless network access node;

b) at each device, using said processing unit, generating a discovery record for each discovered access node, said discovery record comprising a unique identifier of said access node, together with timing information indicating the time of discovery, and storing said discovery record in said memory element;

c) at one device of each set, aggregating discovery records generated by all devices in said set;

d) collecting a set of aggregated discovery records from each of the aggregating devices at a comparing unit;

e) using said comparing unit, comparing the collected aggregated discovery records of each device, and concluding that the sets of devices were in proximity of each other if their respective aggregated discovery records include at least one discovery record comprising the same unique identifier and timing information indicating a time of discovery within a common timespan.

Preferably, the timing indication indicating a time of discovery may be a timestamp. Preferably, the comparing unit may and conclude that the sets of devices were in proximity of each other if their respective aggregated discovery records include at least one discovery record comprising the same unique identifier and a timestamp falling within a common timespan.

Preferably the comparing unit may comprise a data processor or electronic circuitry configured or programmed to provide the functionalities required by steps d) and e) respectively.

Preferably, each aggregating device includes a unique identifier of each device in said set of devices to the set of aggregated discovery records prior to step e).

The unique identifier may comprise a MAC address of an access node, or Cell ID. The unique identifier may preferably be globally unique. Preferably, the unique identifier may be unique to a predetermined context or set of network nodes. Preferably, the unique identifier may change in time. The unique identifier may for example be periodically and randomly generated by said access node.

Preferably, during said collection step, each of said aggregating devices may transmit its respective aggregated discovery records via a data communication channel to a collecting node, and a comparing unit of said collecting node may preferably compare said aggregated discovery records sets at step e) of the method.

Said collecting node may preferably be one of said aggregating devices. Alternatively, said collecting node may be a device dedicated to performing steps d) and e) of the method. It may for example comprise a network server or a collection of network servers that are connected using data communication channel and that are configured to provide the implementation of steps d) and e) collectively as a service. The collecting node may preferably comprise one processing unit that aggregates discovery records received from a set of computing devices, and a further processing unit implementing the comparing functionality described hereabove. Both processing units may be located on different computing devices in communication via a data communication channel.

At least one set of devices may preferably comprise a single device. In that case, said step of aggregating discovery records generated by all devices in said set is implicitly performed at said device, the only device in the set being the set's aggregating device.

Preferably, at least one of said computing devices may comprise a plurality of wireless network interfaces of different types, for communicating with wireless network access nodes of different types, and further wherein:
  the type of each discovered access node may be stored in said discovery records at step b);
  the type of each discovered access node may be taken into account during the comparison at step e).

Preferably, the type of each discovered access node may be taken into account during the aggregation step c).

Each wireless access node type may preferably be associated with a predetermined communication range. Preferably, each wireless access node type may be associated with characterizing measurements and/or transmission models, such as a path loss model.

Preferably, the proximity of two sets of devices is detected within a first communication range at step e) if their respective aggregated discovery records include at least one discovery record comprising the same unique identifier of a wireless network access node of a first type, and timing information indicating a time of discovery within a common timespan.

The wireless network access node type may preferably comprise a cellular data network access node, a wide area network, WAN, access node, or a personal area network, PAN, access node.

Further preferably, said timespan may be in the range of 10 seconds to 1 day. Preferably the range is of 1 minute to 1 hour. Preferably, the timespan may depend on the context of the device. The context of the device may comprise an indication of movement of the device. Preferably, the device may comprise context sensing means, comprising for example an altimeter, a gyroscope or an accelerometer, which are operatively connected to the data processing unit. A shorter timespan may be used when the sensed context indicates that the device is moving, while a longer timespan may be used when the sensed context indicates that the device is substantially at rest. Alternatively, the context may be pre-recorded using scheduling data in a memory element to which the processing unit has access. Alternatively, the processing unit may detect a change of context based on the newly discovered access nodes in the set of discovery records, wherein a constant change of at least a part of the set of discovered access nodes within a given timespan may indicate that the device is moving, whereas as constant set of discovered access nodes in within a given timespan may indicate that the device is at rest.

Said unique identifier stored in said discovery record may preferably be an irreversible hashed value of information identifying said discovered network access node.

If a device discovers a network access node for which a discovery record is already stored in said memory element, the device's processing unit may preferably update the timing information in said discovery record, add timing information in said discovery record, or generate a new discovery record.

In accordance with a further aspect of the invention, a method is provided, the method comprises the following steps:
  at a collecting node in a communication network, the collecting node having a networking interface, collecting discovery records that are received via a data communication channel using said networking interface from at least two computing devices, and storing said discovery records in a memory element, wherein a discovery record comprises a unique identifier of a wireless network access node, together with timing information indicating the time of discovery;
  at the collecting node, comparing the collected discovery records, and concluding that the devices were in proximity of each other if their respectively transmitted discovery records include at least one discovery record comprising the same unique identifier and timing information indicating a time of discovery within a common timespan.

In accordance with another aspect of the invention, a device comprising a networking interface, a processing unit and a memory element is provided. The processing unit is configured for:
  collecting discovery records that are received via a data communication channel using said networking interface from at least two computing devices, and storing said discovery records in a memory element, wherein a discovery record comprises a unique identifier of a wireless network access node, together with timing information indicating the time of discovery;
  comparing the collected discovery records, and concluding that the devices were in proximity of each other if their respectively transmitted discovery records include at least one discovery record comprising the same unique identifier and timing information indicating a time of discovery within a common timespan.

According to a further aspect of the invention, a computer program comprising computer readable code means is provided, which when run on a computer, causes the computer to carry out the method according to aspects of the invention.

The computer program may further comprise computer readable code means, which when run on a computer, causes the computer to carry out the method according to further aspects of the invention.

In accordance with yet another aspect of the invention, a computer program product is provided. The computer program product comprises a computer-readable medium on which the computer program according to aspects of the invention is stored.

Aspects of the present invention provide the possibility to enable the determination of the relative proximity between mobile wireless computing devices, without the requirement of using a centralized server, and without requiring satellite positioning signals. The data that is required for determining the relative proximity between mobile wireless computing devices are obtained by way of wireless network discovery or network scanning. Any wireless device records a unique identifier of any wireless network it detects, together with the time of detection, without being required to connecting to such networks. The method requires no further input and can therefore be executed on a mobile computing device without the device being actively connected to any further node or service in a communication network. Any device having any wireless networking interface may contribute to collecting data that is useful in the method. Privacy of devices and/or their users is respected as, in accordance with embodiments of the invention, the detected network identifiers are hashed prior to being recorded. If two or more devices compare, for example on a peer-to-peer basis, their respective records and if the records on the devices comprise the same hashed identifier within a common timespan, the devices conclude that they were within the communication range of the same wireless network in said timespan. This information may then be used to suggest shared mobility services, such as car- and bike-sharing or on-demand carpooling services, or other social services where physical proximity of users and/or their devices is required. Other applications requiring the information provided by aspects of the invention comprise but are not limited to users's travel behaviour analysis or activity monitoring in general. As no map data or geographical information is required, the provided solution is lightweight and does not require third party service or data providers. The provided method requires a limited amount of memory storage as only the network discovery records are saved. It is estimated that running the method in accordance with aspects of the invention day to day over one year, an amount of only several Megabytes of data will be generated at each computing device. The method may advantageously be executed locally on a computing device, so that it provides enhanced reliability, responsiveness, security and privacy as compared to known methods requiring Internet access and/or satellite positioning signals.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes features of the invention in further detail based on preferred embodiments and on the figures, without limiting the invention to the described embodiments. Unless otherwise stated, features described in the context of a specific embodiment may be combined with additional features of other described embodiments. Throughout the description, similar reference numerals will be used for similar or the same concept across different embodiments of the invention. For example, reference numerals 110, 210, 310, 410 and 510 all refer to a computing device having a wireless network interface, in accordance with the invention.

The wording "computing device" or equivalently "device" is used throughout the description to describe any computing device that is equipped with a wireless networking interface, and that can advantageously be attributed to a user. Examples of a computing device include but are not limited to a Personal Computer, PC, a laptop computer, a smartphone, a tablet computer, a smart television, a smart home appliance, e.g. a fridge equipped with a networking interface, smart glasses, a smart watch, wearable connected devices, connected vehicles, smart Internet of Things, IoT, objects.

Figure 1:
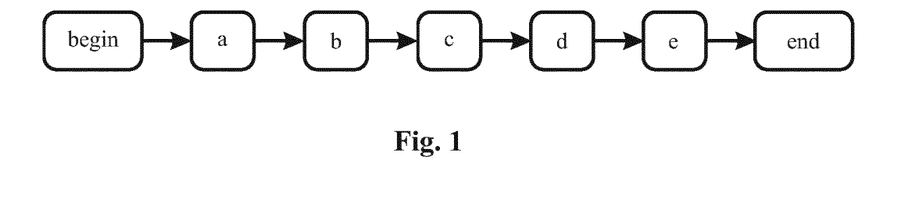
FIG. 1 is a flow diagram showing the main steps according to a preferred embodiment of the method according with the invention.

FIG. 1 shows the main method steps in accordance with a preferred embodiment of the invention. At a first step a) a computing device having a wireless network interface for communicating with wireless network access nodes, discovers at least one wireless network access node. Depending on the wireless network interface, the detected access node may be an access node of any of the following technologies, without being limited thereto:

- a Wireless Personal area network, WPAN (e.g. Bluetooth™ standard IEEE 802.15.1, ZigBee™ IEEE 802.15.4),
- a Wireless Local area network, WLAN (e.g. Wi-Fi™ IEEE 802.11),
- a Wireless Metropolitan area network, WMAN (e.g. WiMax™ IEEE 802.16),
- a Wireless Wide area network, WWAN (e.g. cellular networks such as LTE, UMTS, . . . ).

Several computing devices are grouped together in sets of computing devices, the sets being disjoint. In a preferred embodiment, each set of devices comprises exactly one device.

Each device is equipped with a data processor configured to generate a discovery record for each discovered access node. The data processor has access to a clock unit providing the current time, and preferably all devices are synchronized to a common clock unit. A discovery record comprises an identifier capable of uniquely identifying the discovered access nodes, either globally or within the considered network, and a timing information indicating the time of discovery. The timing information may for example comprise an absolute timestamp, a relative timestamp with respect to the starting time of measurements at the device, an index identifying a measurement period in a set of periodic measurements, or any other timing information that allows the absolute time of discovery to be recovered for the purpose of comparing it to discovery timing information generated at other devices. Moreover, several discoveries of the same access node (or of the same set of access nodes) may be summarized in a combined discovery record comprising as timing information an explicitly stated period, e.g. from 0:00 to 1:35. All discovery records are stored in a memory element, such as a Hard Disk Drive, HDD, Solid State Drive, SDD, an SD card, a volatile memory element such as a Random Access Memory, RAM, module or any virtual memory unit such as distributed storage, where the physical storage spans multiple interconnected devices. This corresponds to step b).

At step c), one device in each set of devices, aggregates the discovery records generated by all device in its set. This operation is preferably performed periodically.

The aggregated discovery records for each set of devices are collected at a comparing unit having a data processor at step d). At step e), the data processor implementing the comparing unit is configured to compare the aggregated discovery records. If the aggregated discovery records stemming from two sets of devices include at least one discovery record having the same unique identifier and timing information indicating a time of discovery within a common continuous or fragmented timespan, then the comparing unit concludes that during said timespan, the sets of devices where in proximity of each other.

Figure 2:
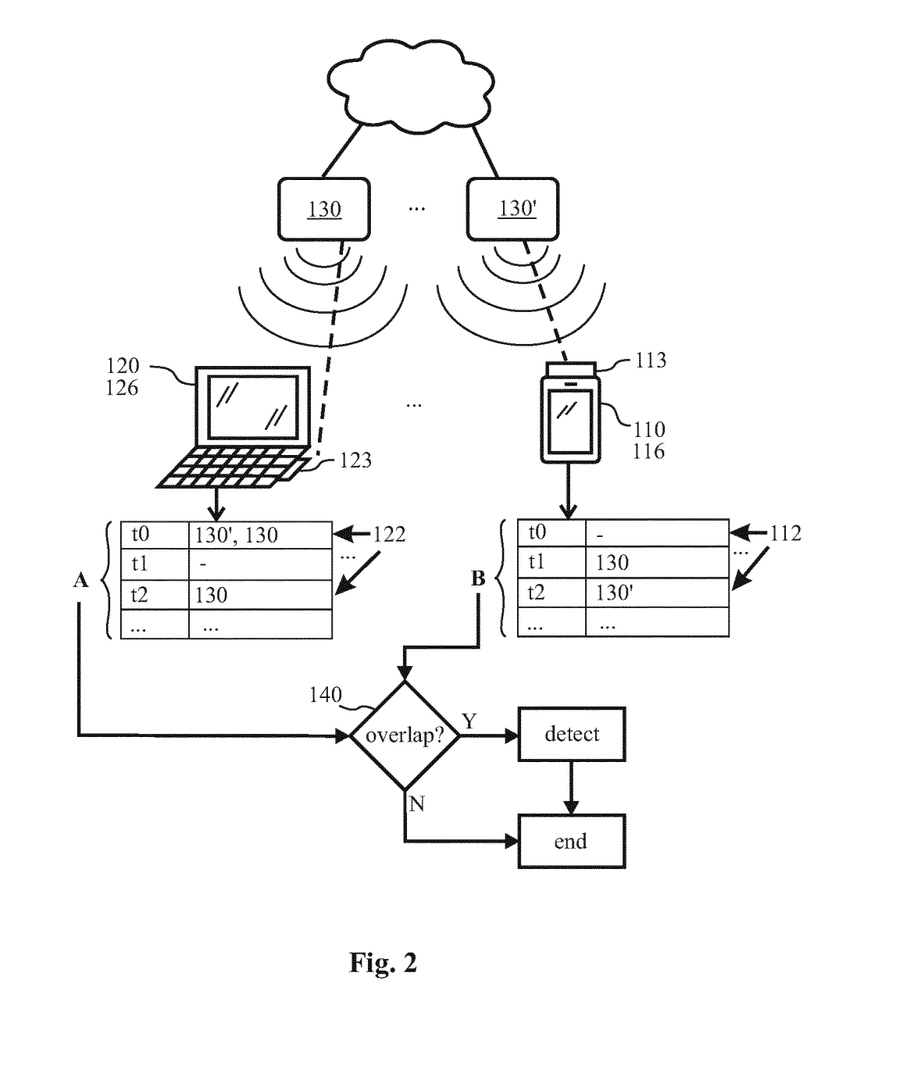
FIG. 2 schematically illustrates a system according to a preferred embodiment of the invention, and a preferred interaction among the system's components.

FIG. 2 illustrates the interaction between the different components or network entities while the method outlined in FIG. 1 is performed. In this example, each set of devices comprises a single device. Computing device 110 is a tablet computer having a WiFi™ networking interface 113, a processing unit such as a Central Processing Unit, CPU, 116 and a non-illustrated memory element. Computing device 120 is a laptop computer having also having a WiFi™ networking interface 123, a CPU 126 and a non-illustrated memory element. While two devices are illustrated, the invention is of course not limited to two devices. The networking interfaces 113, 123 allow the devices to discover any WiFi™ compliant network access nodes 130, 130'. The dotted lines connect interfaces to access nodes that are discoverable by said interfaces at a given time, by way of example only. A WiFi™ network access node typically broadcasts a beacon signal that includes a unique identifier. Each of the devices 110, 120 receives the beacon if it is within the node's 130, 130' range of communication. This approach is called passive network scanning. Alternatively, and if other networking technologies are used, each device 110, 120 may perform active scanning wherein the device actively transmits a probing signal, to which any compatible network access node 130, 130' within the device's communication range responds by transmitting its unique identifier, comprising for example its MAC address, back to the device. This corresponds to step a) in FIG. 1.

In accordance with the example of FIG. 2, at time $t_1$, device 110 discovers the access node 130. It then generates a discovery record 112 as a trace of this network discovery. The discovery record is stored in a memory element to which the device's processing unit 116 has write access. As each set of devices in this example is a singleton set, this corresponds to steps b) and c) in FIG. 1. Device 120 implements the same method steps as it discovers the same access node 130 at a different time $t_2$. The device generates and stores a corresponding discovery record 122. If device 110 discovers an access node 130 for which a previously generated discovery record already exists, it either generates an additional discovery record including the new timestamp, or it updates the existing discovery record by appending the new timestamp in addition to the previously recorded timestamp of first discovery. Alternatively, the timing information in the discovery record may be updated to reflect the correspondingly increased period during which the corresponding access node(s) has been discovered.

As the wireless computing devices 110, 120 move from one location to another, their respective sets A and B of discovery records grow at each new network discovery. The discovery records from each device are collected at a comparing unit 140, in accordance with step d) illustrated in FIG. 1. If the respectively collected sets A and B have a void intersection, i.e., they do not comprise any discovery records having at least one common network access identifier and a discovery timing information falling within a common timespan, the comparing unit concludes that the devices 110, 120 were not in proximity within said timespan. Otherwise, the comparing unit 140 detects that within the common timespan, both devices 110, 120 were in proximity of one another. In the example of FIG. 2, devices 110 and 120 were both within the communication range of network access node 130 during the timespan that comprises instants $t_1$ and $t_2$. The comparison may for example be performed for different adjacent timespans, each timespan ranging from 1 minute to 1 hour. In accordance with this embodiment, the comparing unit does not identify the geographical location or region of proximity. However, the information provided by the comparing unit is useful for a plurality of network services, such as shared mobility services or location-based services, where an indication of the proximity of devices/users is sufficient, without infringing further on the device's users' privacy. The unique identifier of an access node may dynamically change in time, for example from a first unique identifier to a second identifier. In such a case, the comparing unit is preferably configured to match the second identifier to the first identifier, i.e., to detect that both unique identifiers refer to the same access node. If the access node having the second identifier is discovered in proximity with a similar or with the same set of access nodes than the access node having the first identifier, but at different discovery times, the comparing node concludes that the first and second unique identifiers designate the same physical access node.

Figure 3:
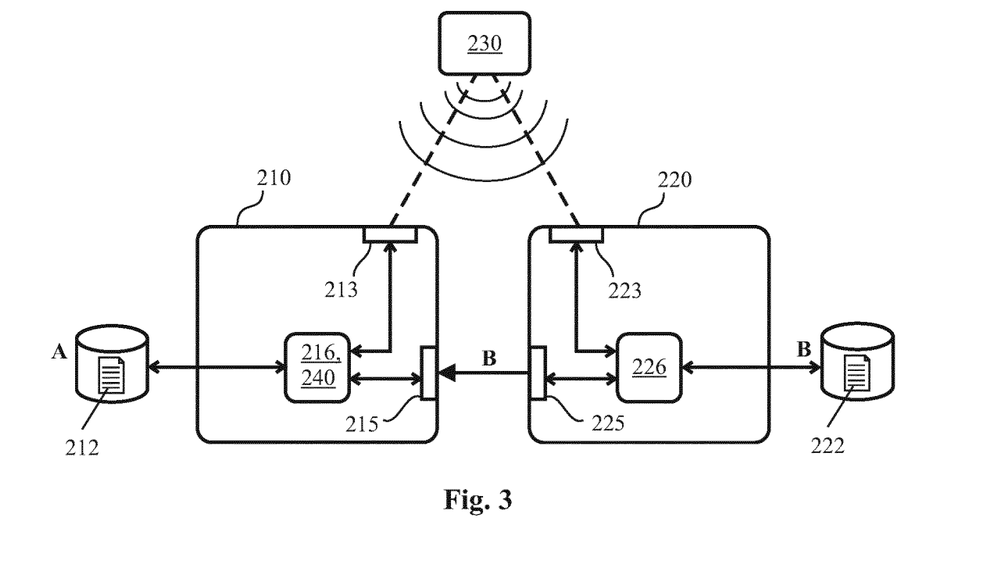
FIG. 3 schematically illustrates a system according to a preferred embodiment of the invention, and a preferred interaction among the system's components.

FIG. 3 shows another embodiment of the invention. In this example, each set of devices comprises a single device. Computing device 210 comprises a networking interface 213, and a processing unit 216 having write access to a memory element storing the set of discovery records A. Computing device 220 is a computing device also having a networking interface 223 of the same type as networking interface 213, and a CPU 226 having write access to a memory element storing the set of discovery records B. The networking interfaces 213, 223 are able to discover network access nodes such as node 230. The processing units 216, 226 are configured to store their respective sets of discovery records 212, 222 in sets A and B, respectively. Network discovery is performed as described in the context of the previous embodiment. In this example, the device 210 also comprises the comparing unit 240, which is implemented by the device's processing unit 216, that has been programmed to that effect. In order to compare their respective sets of discovery records, device 220 transmits its discovery record set B to devices 210, using a data communication channel linking it to device 210 by means of their respective network interfaces 225 and 215. The data communication channel may for example be a Bluetooth™ channel, or a Near Field Communication, NFC, channel. The comparing unit 240 in device 210 then performs the comparison steps as outlined before. Alternatively, both devices 210 and 220 could implement a respective comparing unit and exchange their respective sets of discovery records.

Figure 4:
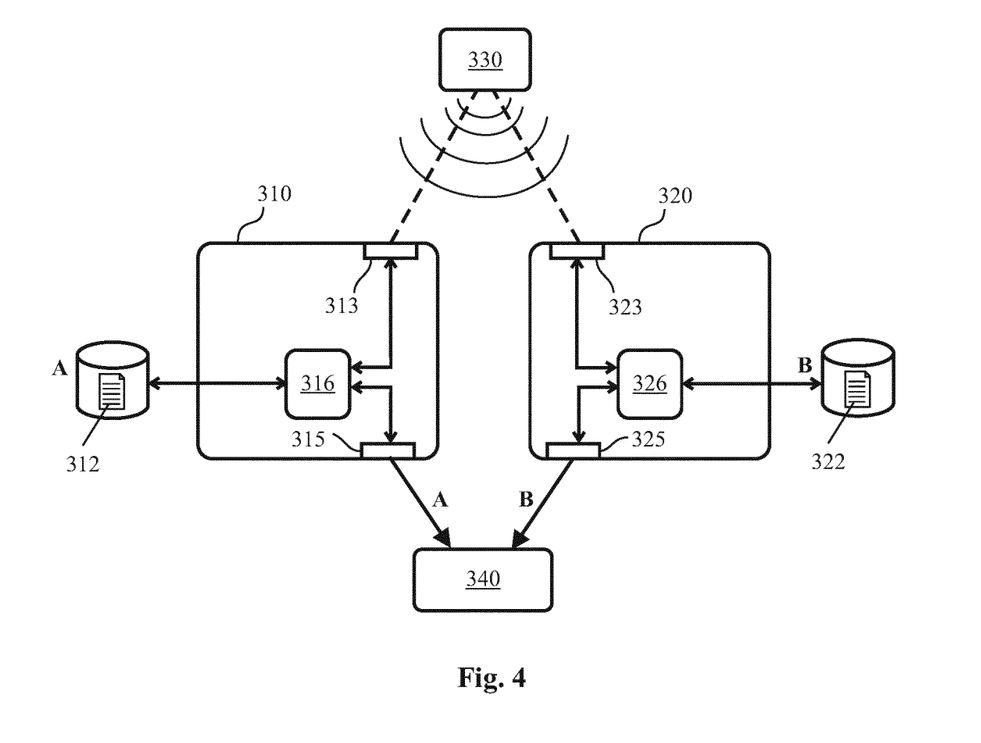
FIG. 4 schematically illustrates a system according to a preferred embodiment of the invention, and a preferred interaction among the system's components.

FIG. 4 shows yet another embodiment of the invention. In this example, each set of devices comprises a single device. Computing device 310 comprises a networking interface 313 and a processing unit 316 having write access to a memory element storing the set of discovery records A, which is for example structured as a table or database. Computing device 320 is a computing device also having a networking interface 323 of the same type as networking interface 313, and a CPU 326 having write access to a memory element storing the set of discovery records B. The networking interfaces 313, 323 are able to discover network access nodes such as node 330. The processing units 316, 326 are configured to store their respective sets of discovery records 312, 322 in sets A and B, respectively. Network discovery is performed as described in the context of previous embodiments. In this example, a distinct networking node, to which devices 310, 320 have access, comprises the comparing unit 340. The comparing node 340 is for example a server located on a public network such as the Internet. Alternatively, it is implemented by a set of interconnected servers that collaboratively provide a distributed implementation of the comparing unit's functionality. In order to compare their respective sets of discovery records, devices 310 and 320 transmit their discovery record sets A and B to node 340, using a data communication channel. The comparing node 340 then performs the comparison steps as outlined before. The result of the comparison is preferably transmitted back to the devices 310, 320 for further use. Alternatively, the comparing node 340 itself may use the result of the comparison to provide further proximity based services to either of the devices 310 or 320.

Figure 5:
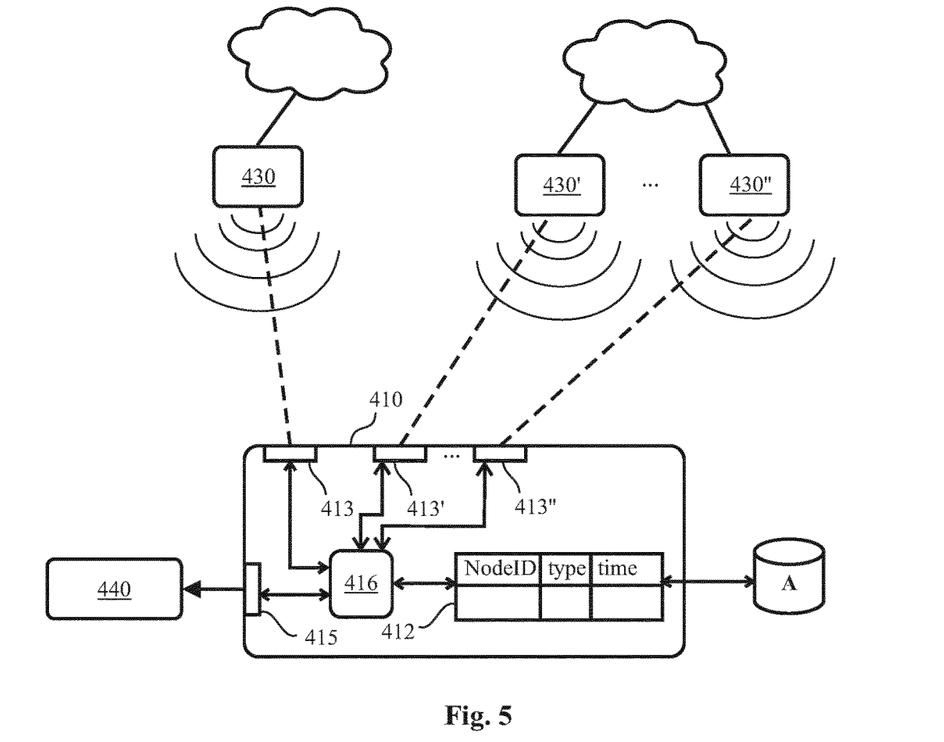
FIG. 5 schematically illustrates a system according to a preferred embodiment of the invention, and a preferred interaction among the system's components.

FIG. 5 shows another embodiment of the invention. For the sake of clarity, only one computing device 410 is shown. The device 410 comprises a plurality of networking interfaces 413, 413', 413" of different types, each interface providing access to another networking technology/protocol and is capable to discover network access nodes 430, 430', 430" of different networking technologies. For example, access node 430 is an antenna of an LTE™ cellular data network, access node 430' is a WiFi™ access node, and 430" is a Bluetooth™ network access node. In this example, the device 410 comprises networking interfaces of the three aforementioned types. The device 410 further comprises a processing unit 416 having write access to a memory element A, which is for example structured as a table or database, for storing the set of discovery records A. The processing unit 416 is configured to store its set of discovery records 412 in the set A. Network discovery is performed as described in the context of previous embodiments. In this example, in addition to a unique identifier of each discovered access node and timing information, e.g., a timestamp of the discovery time, the generated discovery records 412 include an indication of the type of the discovered access node. In this example the indication allows to identify each discovered access node as being either an LTE™, WiFi™ or Bluetooth™ access node. The comparing unit 440 of this example is located on a server located on a public network such as the Internet. In order to compare the set of discovery records A to those of other computing devices, the devices 410 transmits its discovery record set to the network node 440, using a data communication channel. The comparing node 440 then performs the comparison steps as outlined before between set A and the sets of discovery records provided by other devices. By using the additional information indicating the type of each discovered network node, the comparing unit is further able to approximate a range of proximity if a match is found. For example, if the unique identifier that is common to the sets of discovery records of two devices is an identifier of an LTE™ access node, the comparison unit concludes that the devices where in the same area of a city. If the unique identifier that is common to the sets of discovery records of two devices is an identifier of an WiFi™ access node, the comparison unit concludes that the devices where in the same building. If the unique identifier that is common to the sets of discovery records of two devices is an identifier of an Bluetooth™ access node, the comparison unit concludes that the devices where in the same room. In order to arrive at such a conclusion, the comparing unit 440 has access to a memory element in which the types of access networks and their associated features and/or communication ranges are provided. The result of the comparison is preferably transmitted back to the device 410 for further use. Alternatively, the comparing node 440 itself may use the result of the comparison to provide further proximity based services the devices 410.

As an additional feature do described embodiments of the invention, the duration of a timespan during which discovery records are recorded at a measuring device, and the frequency of recording discoveries of network access nodes within a timespan, are dependent on the context in which the device evolves. The context may for example be evaluated using any sensing means which are operatively connected to the data processing unit of the device, including but limited to: an accelerometer, a gyroscope, an altimeter, or others. For example, the device may recognize based on sensor data that it is in motion. As the device is in motion, the network environment it is able to detect is more likely to change compared to the situation in which it is at rest. Therefore, the device may increase the frequency of discoveries and/or reduce the timespan for recording discoveries when the device is moving (for example to the order of 30 to 10 seconds), and it may reduce the frequency and/or increase the timespan for recording discoveries when the device is at rest. In another alternative, the evolution of the context may be pre-recorded in a memory element to which the data processing unit has access. Depending on the current time and schedule information describing a pre-recorded context (i.e. "running", "working", . . . ) the data processing unit may be configured to infer that the device is at rest (working) or on the move (running) The frequency of discovery and/or timespan duration for recording discoveries of network access nodes will then be adapted in accordance with the context. In yet another alternative, the processing unit may infer a change of context from the network access nodes that have been discovered: a host of newly discovered access nodes, or an ongoing change in the set of discovered access nodes within a given timespan gives an indication of movement of the device.

As an additional feature to described embodiments of the invention, the information stored in discovery records is enriched using further data obtained from the discovered access node. If the access node is a WiFi™ access nodes, this includes for example information transmitted in beacon frames, such as a MAC address, beacon interval, RSSI, BSS load, country, etc . . . , in accordance with the nodes' features. These pieces of information allow to further characterize the discovered access node. If the access node is a cellular data (GSM/CDMA/LTE/ . . . ) node, the further data may include the current cell ID, RSSI, location of the antenna, technology, neighbouring cells, etc. If the discovered access node is Bluetooth™ access node, the further data may include MAC address, RSSI, manufacturer specific data (name, model, etc.). These data allow to further refine the detected proximity of two devices. For example, based on the signal strength, RSSI, detected at two proximal devices, an estimation of their relative distance, or an indication quantifying their relative proximity, may be computed.

Figure 6:
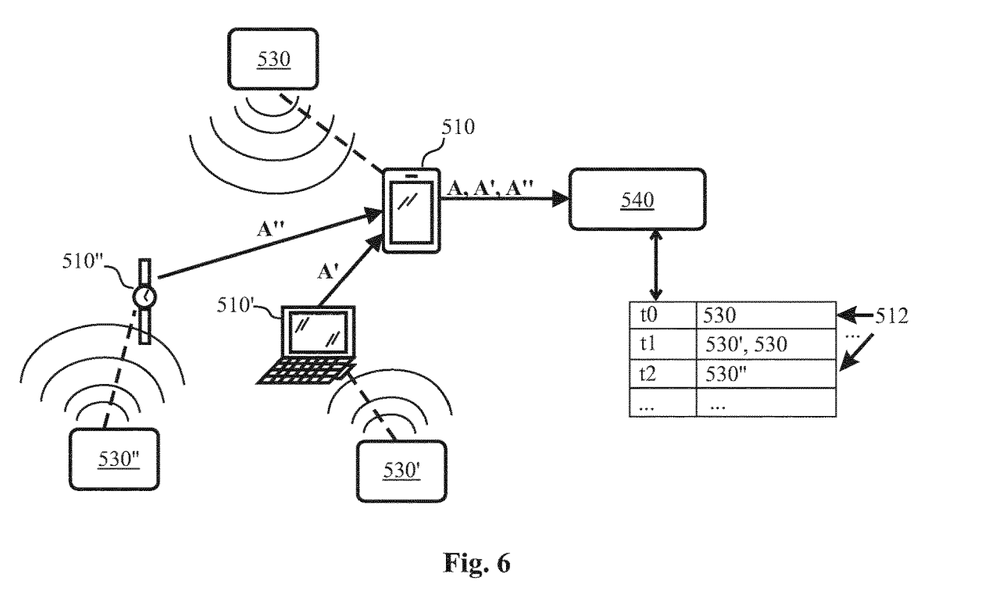
FIG. 6 schematically illustrates details of a system according to a preferred embodiment of the invention, and a preferred interaction among the system's components.

FIG. 6 shows an alternative that is applicable to all of the previously described embodiments. In accordance with this example, the device 510 belongs to a set of computing devices, together with devices 510' and 510". Each of the devices in the set has a network interface for communicating with wireless access nodes, possibly of different types 530, 530' and 530" respectively, as previously described. The devices each discover wireless network access nodes and generate their own sets of discovery records A, A' and A" accordingly and store them in a memory element such as a structured database. One of the devices is configured as an aggregating device. The aggregating device may be determined by a user, or the devices within a common set may designate one device as being the aggregating device based on a distributed consensus algorithm, for example. It aggregates the discovery records 512, stemming from discovery record sets A, A', and A"' and having been generated by all devices in the same set through data transmission, before transmitting the aggregated discovery records 512 to a comparing unit 540 as previously described. The aggregating device 510 of the set is the only device within the set that communicates with the comparing unit 540. The devices within a set may for example belong to the same user, and some devices may not have the capability of communicating directly with the comparing unit 540. The wearable device 510" may for example only be equipped with a Bluetooth™ network interface, but a WiFi™ channel may be used to contact the comparing unit. By aggregating the discovery records first via a Bluetooth™ channel at the smartphone 510, the latter is then able to transmit all received discovery records via a WiFi™ channel to the comparing unit 540. As the user typically wears or uses the devices 510, 510', 510" together and in proximity of each other, their respective discovery records may nevertheless all contribute to improve on the detection of the user's proximity to other users.

In all embodiments, the unique identifiers stored in discovery records may preferably be hashed values of the identifiers that are transmitted by the discovered network access nodes. Known hashing functions, such as md5 or sha-1, provide a unique output from any input data and are irreversible in the sense that the input data cannot be recovered to the output data. Intercepting any such discovery records as such provides no useful information and therefore safeguards the privacy of the device's user. However, when a comparing unit detects the same hashed values within two sets of discovery records, it may still unambiguously conclude that the devices from which the two sets of discovery records emanated were within the communication range of a same network access node.

The methods outlined here above are preferably implemented using processing means such as a data processor, which is appropriately programmed, or by specific electronic circuitry, as it is known in the art. The skilled person is capable of providing such programming code means or circuitry providing the required functionality based on the description that has been given, based on the drawings and without undue further burden.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A computer-implemented method for detecting a proximity of at least two disjoint sets of computing devices, comprising:
    discovering at least one wireless network access node by each of the computing devices, wherein the computing devices each include at least one wireless network interface for communicating with wireless network access nodes, a processing unit and a memory element;
    generating a discovery record for the at least one wireless network access node, wherein the discovery record includes a unique identifier of the at least one wireless network access node and timing information indicating a time of discovery of the at least one wireless network access node, wherein the discovery record is stored on the memory element;
    aggregating a plurality of discovery records generated by all of the computing devices in each disjoint set, wherein aggregation of the plurality of discovery records is completed by aggregating devices, wherein the aggregating devices include at least one computing device of each disjoint set;
    collecting aggregated discovery records from each of the aggregating devices, wherein a comparing unit collects the aggregated discovery records, wherein collecting the aggregated discovery records includes transmitting respective aggregated discovery records from each of the aggregating devices through a data communication channel to a collecting node, wherein a comparing unit of the collecting node compares the aggregated discovery records; and
    comparing the aggregated discovery records by the comparing unit and concluding that the disjoint sets of the computing devices were in proximity of one another upon determining that respective aggregated discovery records associated with each computing device include at least one discovery record that include the unique identifier and the timing information indicating the time of discovery within a common timespan.

2. The computer-implemented method of claim 1, wherein the collecting node is one of the aggregating devices.

3. The computer-implemented method of claim 1, wherein at least one set of computing devices comprises a single device.

4. The computer-implemented method of claim 1, wherein at least one of the computing devices comprises a plurality of different types of wireless network interfaces for communicating with different types of wireless network access nodes, wherein a type of each discovered access node is stored in the discovery record generated for the at least one wireless network access node, and wherein the type of each discovered access node is analyzed during the comparison of the aggregated discovery records.

5. The computer-implemented method of claim 4, wherein each type of wireless access node is associated with a predetermined communication range.

6. The computer-implemented method of claim 4, wherein the proximity of the at least two disjoint sets of computing devices is detected within a first communication range if their respective aggregated discovery records include at least one discovery record comprising the unique identifier of a wireless network access node of a first type and timing information indicating a time of discovery within a common timespan.

7. The computer-implemented method of claim 4, wherein each type of wireless network access node comprises a cellular data network access node, a wide area network (WAN) access node, or a personal area network (PAN) access node.

8. The computer-implemented method of claim 1, wherein the timespan is in the range of 10 seconds to 1 day.

9. The computer-implemented method of claim 1, wherein the unique identifier stored in the discovery record is an irreversible hashed value of information identifying the at least one wireless network access node discovered by each of the computing devices.

10. The computer-implemented method of claim 1, wherein the processing unit updates the timing information in the discovery record, adds timing information in the discovery record, or generates a new discovery record, upon discovering a network access node for which a discovery record is already stored on the memory element.

11. A system for detecting a proximity of at least two disjoint sets of computing devices comprising:
    a memory element storing instructions when executed by a processing unit cause the processing unit to:
        collect discovery records that are received through a data communication channel using a networking interface from at least two computing devices and store the discovery records on a memory element, wherein each discovery record includes a unique identifier of a wireless network access node and timing information indicating a time of discovery of the wireless network access node;

aggregate the discovery records that are received through the data communication channel, wherein aggregation of the plurality of discovery records is completed by aggregating devices, wherein the aggregating devices include at least one computing device of each of the at least two disjoint sets, collect aggregated discovery records from each of the aggregating devices wherein a comparing unit collects the aggregated discovery records, wherein collecting the aggregated discovery records includes transmitting respective aggregated discovery records from each of the aggregating devices through a data communication channel to a collecting node, wherein a comparing unit of the collecting node compares the aggregated discovery records; and compare the aggregated discovery records by the comparing unit and conclude that the at least two disjoint sets of the computing devices were in proximity of one another upon determining that respective aggregated discovery records associated with each computing device include at least one discovery record that include the unique identifier and the timing information indicating the time of discovery within a common timespan.

12. A non-transitory computer readable storage medium storing instructions that when executed by a computer, which includes a processor perform a method, the method comprising:

collecting discovery records that are received through a data communication channel using a networking interface from at least two computing devices and storing the discovery records on a memory element, wherein each discovery record includes a unique identifier of a wireless network access node and timing information indicating a time of discovery of the wireless network access node;

aggregating the discovery records that are received through the data communication channel, wherein aggregation of the plurality of discovery records is completed by aggregating devices, wherein the aggregating devices include at least one computing device of each of at least two disjoint sets;

collecting aggregated discovery records from each of the aggregating devices, wherein a comparing unit collects the aggregated discovery records, wherein collecting the aggregated discovery records includes transmitting aggregated discovery records through a data communication channel to a collecting node, wherein a comparing unit of the collecting node compares the aggregated discovery records; and comparing the aggregated discovery records by the comparing unit and concluding that the at least two disjoint sets of the computing devices were in proximity of one another upon determining that respective aggregated discovery records associated with each computing device include at least one discovery record that include the unique identifier and the timing information indicating the time of discovery within a common timespan.

13. The non-transitory computer readable storage medium of claim 12, wherein at least one of the computing devices comprises a plurality of different types of wireless network interfaces for communicating with different types of wireless network access nodes, wherein a type of each discovered access node is stored in the discovery record generated for the at least one wireless network access node, wherein the type of each discovered access node is analyzed during the comparison of the aggregated discovery records.

* * * * *